United States Patent
Ewert

(10) Patent No.: US 12,252,147 B2
(45) Date of Patent: Mar. 18, 2025

(54) METHOD AND SYSTEM FOR PROMPTING AN EVASIVE MANEUVER OF AUTONOMOUS OR SEMI-AUTONOMOUS VEHICLES

(71) Applicant: Robert Bosch GmbH, Stuttgart (DE)

(72) Inventor: Marlon Ramon Ewert, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1031 days.

(21) Appl. No.: 16/651,141

(22) PCT Filed: Nov. 6, 2018

(86) PCT No.: PCT/EP2018/080237
§ 371 (c)(1),
(2) Date: Mar. 26, 2020

(87) PCT Pub. No.: WO2019/086689
PCT Pub. Date: May 9, 2019

(65) Prior Publication Data
US 2020/0239019 A1 Jul. 30, 2020

(30) Foreign Application Priority Data
Nov. 6, 2017 (DE) .......................... 102017219599.1

(51) Int. Cl.
*H04W 4/46* (2018.01)
*B60W 50/029* (2012.01)
(Continued)

(52) U.S. Cl.
CPC .......... *B60W 50/14* (2013.01); *B60W 50/029* (2013.01); *G07C 5/008* (2013.01);
(Continued)

(58) Field of Classification Search
CPC .............. B60W 50/14; B60W 50/029; B60W 2554/804; B60W 2554/802;
(Continued)

(56) References Cited

U.S. PATENT DOCUMENTS

| 6,449,400 B1 * | 9/2002 | Watanabe .......... G01M 11/3109 385/12 |
| 8,520,695 B1 | 8/2013 | Rubin et al. |

(Continued)

FOREIGN PATENT DOCUMENTS

| DE | 102011115223 A1 | 3/2013 |
| DE | 102015202837 A1 | 8/2015 |

(Continued)

OTHER PUBLICATIONS

International Search Report for PCT/EP2018/080237, Issued Jan. 25, 2019.

*Primary Examiner* — Kito R Robinson
*Assistant Examiner* — Roy Rhee
(74) *Attorney, Agent, or Firm* — NORTON ROSE FULBRIGHT US LLP; Gerard A. Messina

(57) ABSTRACT

A method for prompting an evasive maneuver by at least one first autonomous or semi-autonomous vehicle. A vehicle state of the at least one first vehicle is ascertained by a control unit of the at least one first vehicle. Vehicles within a minimum distance are ascertained by the at least one first vehicle. The ascertained data of the at least one first vehicle are transmitted within the minimum distance to ascertained vehicles by the at least one first vehicle in order to prompt an adaptation of a trajectory and/or a speed of the ascertained vehicles. The at least one first vehicle being transferred into a safe state. A system is also provided.

14 Claims, 1 Drawing Sheet

(51) Int. Cl.
*B60W 50/14* (2020.01)
*G07C 5/00* (2006.01)
*G07C 5/08* (2006.01)
*H04B 17/318* (2015.01)

(52) U.S. Cl.
CPC ......... *G07C 5/0816* (2013.01); *H04B 17/318* (2015.01); *H04W 4/46* (2018.02); *B60W 2050/0292* (2013.01); *B60W 2554/802* (2020.02); *B60W 2554/804* (2020.02)

(58) Field of Classification Search
CPC ........ B60W 2050/0292; H04B 17/318; H04W 4/46; G07C 5/008; G07C 5/0816
See application file for complete search history.

(56) References Cited

U.S. PATENT DOCUMENTS

| | | | |
|---|---|---|---|
| 2017/0019887 A1* | 1/2017 | Jiang | H04W 72/1263 |
| 2018/0095457 A1* | 4/2018 | Lee | G05D 1/0061 |
| 2018/0126931 A1* | 5/2018 | Deragården | G08G 1/22 |
| 2018/0217229 A1* | 8/2018 | Shukla | G01S 17/42 |
| 2020/0256685 A1* | 8/2020 | Kamphenkel | G01C 21/3407 |

FOREIGN PATENT DOCUMENTS

| | | |
|---|---|---|
| JP | 2007176372 A | 7/2007 |
| JP | 2007293625 A | 11/2007 |
| JP | 2010183178 A | 8/2010 |
| JP | 2014063240 A | 4/2014 |
| JP | 2016216023 A | 12/2016 |
| JP | 2017117414 A | 6/2017 |
| WO | 2015190329 A1 | 12/2015 |

\* cited by examiner

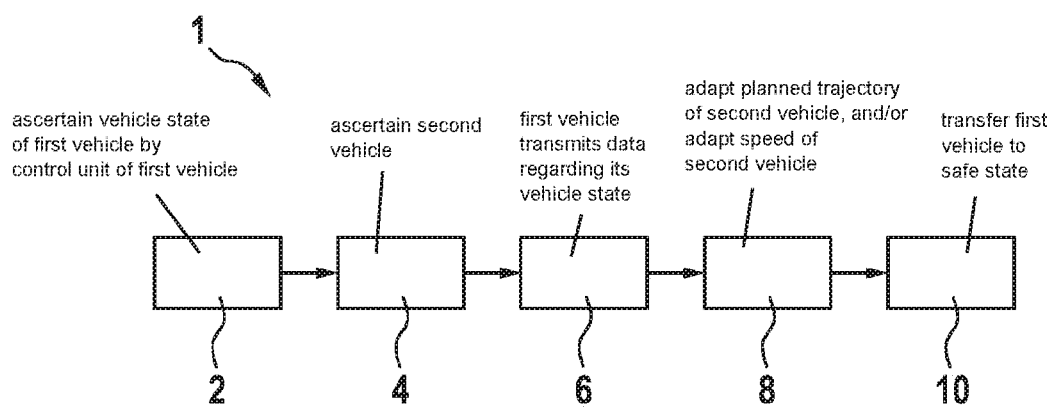

METHOD AND SYSTEM FOR PROMPTING AN EVASIVE MANEUVER OF AUTONOMOUS OR SEMI-AUTONOMOUS VEHICLES

FIELD

The present invention relates to a method for prompting an evasive maneuver by at least one first autonomous or semi-autonomous vehicle, and to a system.

BACKGROUND INFORMATION

Autonomous vehicles may control their trajectory, speed, and the braking behavior themselves by way of automatically detecting, for example, the road course, other road users, or obstacles and calculating the corresponding control commands in the vehicle and forwarding the control commands to the actuators in the vehicle, whereby the driving profile of the vehicles is correctly influenced. The intervention by the driver is not necessary in a fully autonomous vehicle. Semi-autonomous as well as autonomous vehicles may experience a malfunction during the driving operation, however. In the case of an occurring defect, autonomous or semi-autonomous vehicles are transferred into a safe state. A safe state may include throttling the speed or also heading toward a shoulder or a nearby parking facility.

Car-to-X communications are already being utilized in many vehicles. During a car-to-car communication, data of a vehicle, such as ABS interventions, steering angle, position, direction, and speed, may be collected and transmitted to the other road users via a radio link, such as WLAN or UMTS. A car-to-infrastructure communication is understood to mean the exchange of data between a vehicle and the surrounding infrastructure, such as traffic light installations. At present, a calculation of the other road users surrounding a vehicle takes place via observation of their trajectories. It is not possible, however, to plan ahead and prepare for an evasive maneuver in the event of a foreseeable potential hazardous situation.

SUMMARY

An object of the present invention may be considered that of providing an example method for planning and carrying out an evasive maneuver of multiple autonomous or semi-autonomous vehicles, in which, in the case of a foreseeable potential hazard due to a defective vehicle, surrounding vehicles may be informed of the state of the defective vehicle and may adapt their driving behavior accordingly.

This object may be achieved with the aid of the present invention. Advantageous embodiments of the present invention are described herein.

According to one aspect of the present invention, an example method is provided for prompting an evasive maneuver by at least one first autonomous or semi-autonomous vehicle. A vehicle state of the at least one first vehicle is ascertained by an internal control unit of the at least one first vehicle. Thereafter, all vehicles located within a minimum distance of the first vehicle are ascertained. The data of the at least one first vehicle are transmitted to the ascertained vehicles by the at least one first vehicle in order to prompt an adaptation of a trajectory and/or the speed of the vehicles within the minimum distance. Thereafter, the at least one first vehicle is transferred into a safe state by the internal control unit of the at least one first vehicle.

The example method according to the present invention makes it possible that vehicles located in the direct proximity of a defective autonomous or semi-autonomous vehicle may initiate evasive maneuvers or increase their distance to the corresponding vehicle as soon as the autonomous vehicle has a malfunction and must be transferred into a safe state. A safe state of the at least one first vehicle may be achieved by initiating a brake application and, thus, by throttling the speed of the at least one first vehicle or also heading toward a shoulder or a nearby parking facility. The vehicle state of the at least one first vehicle may be carried out with the aid of a diagnostic function by the internal control unit of the first vehicle. In the case of a detected malfunction or a detected defect of the first vehicle, the server unit may assign a criticality to the defect. Thereafter, it may be ascertained whether vehicles are located in the surroundings of the first vehicle. The collected data regarding the vehicle state of the at least one first vehicle may be sent directly to adjacent vehicles or transmitted in a surrounding area. The adjacent vehicles may evaluate the received information and adapt their trajectories or their driving behavior accordingly.

In the case of a defect of the first vehicle, for example, a braking operation may be initiated by the adjacent vehicle, in order to increase the distance to the at least one first vehicle. A circumnavigation of the first vehicle by at least one second vehicle may be initiated, including a sufficient safety distance to the at least one first vehicle. As a result, the safety in traffic may be considerably enhanced and a foreseeable hazard due to a defective vehicle may be minimized. The risk of a collision between the at least one first vehicle and the at least one second vehicle may be reduced.

According to one further exemplary embodiment of the method of the present invention, the ascertained data are transmitted by the at least one first vehicle to the at least one second vehicle via a car-to-car communication. The technology necessary therefor, such as communication devices, is already present in many vehicles and may be utilized, unchanged, for the method. Usually, a car-to-car communication may take place via radio links such as WLAN, LTE, and the like.

According to one further exemplary embodiment of the method of the present invention, the ascertained data regarding the vehicle state of the at least one first vehicle are cyclically transmitted from the at least one first vehicle to at least one second vehicle. The data exchange may take place in a periodic cycle. In this way, the vehicles may also ascertain, at any time, whether a defective vehicle is located in their proximity or at a defined minimum distance or whether all vehicles within the minimum distance function properly. In this way, an adaptation of the driving behavior of the vehicles within the minimum distance may take place. If, for example, all vehicles in the surroundings of the at least one first or one second vehicle are underway without a defect, the trajectory planning operations of the vehicles within the minimum distance take place as usual.

According to one further exemplary embodiment of the method of the present invention, in the event that a defect of the at least one first vehicle is detected, the data regarding the vehicle state are transmitted by the at least one first vehicle to the at least one second vehicle. As a result, the transmission of the data takes place only within a defined distance between the vehicles, so that the data are transmitted only if there is a specific need. The data volume to be transmitted may therefore be reduced. Due to the reduction of the data volume to be transmitted for the occurring case of a defect of the at least one first vehicle, a processing load necessary for the evaluation may be reduced and unnecessary data volumes as well as their storage may be prevented. As a result, the control units installed in the vehicles may be designed to be more compact and more cost-effective.

According to one further exemplary embodiment of the example device of the present invention, data regarding the type of the defect of the at least one first vehicle, the time remaining until the necessary initiation of a safe state by the at least one first vehicle, and the planned type of the safe state may be transmitted to the at least one second vehicle. The defect may be assigned to a defined numeric code, which may be read and evaluated by any vehicle or a control unit. In addition, the previously determined criticality of the defect of the at least one first vehicle may be transmitted to the at least one second vehicle, in order to ascertain a potential hazard or also an urgency of the adaptation of its trajectory. Moreover, the first vehicle transmits, to the at least one second vehicle, the time remaining until the at least one first vehicle is transferred into a safe state. In addition, it transmits the type of the planned safe state, where, depending on the degree of the criticality of the defect of the at least one first vehicle, it may be necessary to decelerate and slow the speed, head toward a nearby parking facility, or stop, as quickly as possible, at the edge of the road or on a shoulder. In addition, further data, such as vehicle identification number, vehicle type, the vehicle size, the planned trajectory during the transfer into the safe state, as well as the present manual or autonomous operating mode may be transmitted to the at least one second vehicle.

According to one further exemplary embodiment of the method of the present invention, instances of material fatigue, software errors or hardware errors are detected by the control unit of the at least one first vehicle as a defect of the at least one first vehicle. The at least one first vehicle may encompass a monitoring of the vehicle state with the aid of further sensors. In the process, not only software errors, but also defects at the electrical components or also mechanical defects at components of the vehicle may be monitored and utilized for ascertaining a vehicle state. As a result, a precise conclusion may be reached regarding the vehicle state of the at least one first vehicle.

According to one further exemplary embodiment of the method according to the present invention, if a defect occurs, the data regarding the ascertained vehicle state are transmitted by the at least one first vehicle to an external server unit. The external server unit may be part of a traffic infrastructure, via which existing car-to-X communication data may be exchanged. Therefore, the vehicles may communicate with one another directly or indirectly via the external server unit and transmit data among one another. The traffic infrastructure may be, for example, a server or a cloud, which are associated with an authority, such as the police or emergency services, an insurance company, a towing service, a vehicle manufacturer, or further institutions. An evaluation of the transmitted data of the defective vehicle takes place as soon as the data arrive at the server or the cloud. As a result, it is possible, for example, to automatically promptly pick up inoperable vehicles with the aid of a towing service. In addition, authorities may be informed about the defective vehicle, so that the authorities may observe the further traffic situation in a targeted manner while the autonomous vehicle is transferred into a safe state. If an accident occurs during the implementation of the evasive maneuver of the defective autonomous vehicle, the authorities may arrive at the accident location as quickly as possible. In addition, the occupants of the autonomous vehicle may be provided, by the authorities, with instructions regarding the further behavior via the car-to-X communication link. Moreover, a vehicle manufacturer may be informed about the stranded vehicle and the type of the defect. The vehicle manufacturer is now familiar with the defect of the autonomous vehicle and may eliminate this defect in the further vehicles of its vehicle fleet, for example, by way of a vehicle recall.

According to one further exemplary embodiment of the method of the present invention, the value for the minimum distance is varied depending on the speed of the at least one first vehicle and/or the speed of the at least one second vehicle. It may be necessary to adapt the minimum distance depending on the speed of the at least one first vehicle and of the at least one second vehicle spaced apart from the at least one first vehicle. For example, a shorter distance between the vehicles may be necessary for a transmission of data in the case of a high speed and a resultant poorer radio link between the vehicles. In the case of slow travel and a stable car-to-car communication link, a data exchange between vehicles may also be made possible across a longer distance. The distances between the vehicles may be adjustable or variable under consideration of minimum legal requirements for safety distances.

According to one further exemplary embodiment of the method of the present invention, the value for the minimum distance is varied depending on a signal strength of the car-to-car communication between the at least one first vehicle and the at least one second vehicle. The quality of the car-to-car communication between the at least one first vehicle and the at least one second vehicle may be affected by various factors, such as shielding by buildings, weather conditions, a poor network coverage, or the like. Depending on the stability of the car-to-car communication between the at least one first vehicle and the at least one second vehicle, the minimum distance may be varied, in that data regarding vehicle states are transmitted. In the case of a weak signal strength of the car-to-car communication link, the at least one first vehicle may transmit its data to vehicles in its immediate surroundings. In the case of a stable or high-signal-strength car-to-car communication link, the data may also be transmitted to vehicles located a greater distance away.

According to one further exemplary embodiment of the method, data are transmitted from the at least one second vehicle to the at least one first vehicle. Therefore, the manner in which the first vehicle as well as the second vehicle will or may implement an evasive maneuver may be transmitted to both vehicles before the first vehicle is transferred into a safe state. In the process, the at least one second vehicle may transmit its own vehicle state, for example, to the at least one first vehicle and also report its possible defects or malfunctions to the at least one first vehicle. In addition, the at least one second vehicle may transmit its trajectory, which was planned due to a defect of the at least one first vehicle, to the at least one first vehicle during an evasive maneuver. Therefore, the manner in which the first vehicle as well as the second vehicle will or may implement an evasive maneuver may be transmitted to both vehicles before the first vehicle is transferred into a safe state. As a result, the risk of a collision between the at least one first vehicle and the at least one second vehicle may be reduced.

According to one further aspect of the present invention, an example system is provided for implementing the method according to the present invention. The system encompasses at least one first vehicle including a control unit for ascertaining a vehicle state of the at least one first vehicle and the at least one second vehicle. According to the present invention, based on the ascertained vehicle state of the at least one first vehicle, the ascertained vehicle state is transmittable via a communication link directly or via an external server unit to the at least one second vehicle, a trajectory and/or a speed of the at least one second vehicle being adaptable by a control unit of the at least one second vehicle depending on the vehicle state of the at least one first vehicle.

As a result, the vehicles of the system may communicate with one another, in particular if an error occurs or if there is a defect, in such a way that they may jointly carry out a concerted evasive maneuver. In particular, the at least one second vehicle may "adjust" to a defective vehicle positioned ahead of it and resort to further measures, such as throttling a speed, initiating an evasive maneuver, or the like. A communication link between the particular vehicles may take place directly or via the external server unit, depending on the position and the distance. As a result, the safety of the vehicles in traffic may be enhanced.

A preferred exemplary embodiment of the present invention is explained in greater detail below with reference to a highly simplified schematic FIGURE.

BRIEF DESCRIPTION OF THE DRAWING

FIG. 1 shows an example method for carrying out an evasive maneuver according to a first exemplary embodiment.

DETAILED DESCRIPTION OF EXAMPLE EMBODIMENTS

FIG. 1 shows an example method 1 for carrying out an evasive maneuver according to a first exemplary embodiment.

For the sake of simplicity, two vehicles are described, where the method according to the present invention may encompass any number of vehicles.

In a first step, a vehicle state of the first vehicle is ascertained 2 by a control unit of the first vehicle.

Depending on ascertained vehicle state 2 and a speed of the first vehicle, a surrounding area having a minimum distance M is defined. In the defined surrounding area, the existing vehicles and, in particular, the second vehicle are ascertained 4.

Thereafter, the first vehicle transmits data regarding its vehicle state 6 into minimum distance M and beyond. These ascertained data regarding its vehicle state 6 may be perceived or received by all vehicles within minimum distance M. In particular, the vehicle data may be transmitted into minimum distance M in order to prompt a cautious driving behavior as a warning or in order to prompt a speed adaptation and/or a trajectory adaptation. A response of the second vehicle may take place. For this purpose, the second vehicle may transmit, for example, its vehicle state to the first vehicle.

The vehicle state of the first vehicle may be evaluated by a control unit of the second vehicle and, based on a result of the evaluation, an adaptation of a planned trajectory of the second vehicle and/or an adaptation of the speed of the second vehicle may be carried out 8. The vehicle state of the first vehicle may also contain pieces of information regarding defects and a planned transfer of the first vehicle into a safe state, so that the second vehicle may adapt its trajectory to a future trajectory of the first vehicle.

After a data exchange of the first vehicle with the second vehicle, the second vehicle is warned, the first vehicle may be transferred 10 into a safe state already during a transmission of the vehicle data into minimum distance M.

What is claimed is:

1. A method for controlling an evasive maneuver by a first autonomous or semi-autonomous vehicle, the method comprising the following steps:
   ascertaining, by a control unit of the first vehicle, a vehicle state of the first vehicle;
   ascertaining, by the first vehicle, vehicles that are within a defined distance from the first vehicle;
   transmitting, by the first vehicle, data of the first vehicle regarding the ascertained vehicle state to the ascertained vehicles that are within the defined distance, for prompting an adaptation of a trajectory and/or speed of the ascertained vehicles that are within the defined distance; and
   transferring the first vehicle into a safe state;
   wherein the method further comprises at least one of the following features (a)-(b):
      (a) receiving a response from the ascertained vehicles, and implementing a delay of the transfer to wait for the reception of the response; and
      (b) varying the defined distance for which the first vehicle performs the vehicle ascertainment, for the transmission of the data to the ascertained vehicles, depending on a speed of the first vehicle.

2. The method as recited in claim 1, wherein the transmission is via a car-to-car communication.

3. The method as recited in claim 2, wherein the transmission is performed cyclically.

4. The method as recited in claim 2, wherein the transmission is performed in response to a determination, by the first vehicle, of presence of a defect of the first vehicle.

5. The method as recited in claim 4, wherein the data includes an identification of a type of the defect of the first vehicle, a maximum time remaining until the initiation of the safe state, and a planned type of the safe state of the first vehicle.

6. The method as recited in claim 4, wherein instances of material fatigue, and/or software errors, and/or hardware errors are detected by the control unit of the first vehicle as the defect of the first vehicle.

7. The method as recited in claim 4, wherein the data are additionally transmitted to an external server unit.

8. The method as recited in claim 2, wherein a value for the defined distance is varied depending on a signal strength of the car-to-car communication between the first vehicle and the ascertained vehicles.

9. The method as recited in claim 2, wherein data are transmitted from the ascertained vehicles to the first vehicle.

10. The method as recited in claim 1, wherein the method comprises the receiving of the response from the ascertained vehicles, the transfer being delayed to wait for the reception of the response.

11. The method as recited in claim 1, wherein the method further comprises the varying of the defined distance for which the first vehicle performs the vehicle ascertainment, for the transmission of the data to the ascertained vehicles, depending on the speed of the first vehicle.

12. The method as recited in claim 11, wherein the distance is decreased in response to an increase in the speed of the first vehicle.

13. The method as recited in claim 11, wherein the distance defines a radius around the first vehicle.

14. A system, comprising:
   a first vehicle including a control unit configured to ascertain a vehicle state of the first vehicle;

wherein:
    the first vehicle is configured to:
        ascertain vehicles that are within a defined distance from the first vehicle; and
        transmit data of the first vehicle regarding the ascertained vehicle state, via a communication link, to the ascertained vehicles that are within the defined distance, for prompting an adaptation of a trajectory and/or a speed of the ascertained vehicles that are within the defined distance;
    the control unit is configured to:
        transfer the first vehicle into a safe state; and
        perform at least one of the following features (a)-(b):
            (a) receive a response from the ascertained vehicles, and implementing a delay of the transfer to wait for the reception of the response; and
            (b) vary the defined distance for which the first vehicle performs the vehicle ascertainment, for the transmission of the data to the ascertained vehicles, depending on a speed of the first vehicle.

\* \* \* \* \*